US011610097B2

(12) United States Patent
Lee et al.

(10) Patent No.: US 11,610,097 B2
(45) Date of Patent: Mar. 21, 2023

(54) APPARATUS AND METHOD FOR GENERATING SAMPLING MODEL FOR UNCERTAINTY PREDICTION, AND APPARATUS FOR PREDICTING UNCERTAINTY

(71) Applicants: Seoul National University R&DB Foundation, Seoul (KR); hodooAI Lab Inc., Seoul (KR)

(72) Inventors: Jungwoo Lee, Seoul (KR); Chanwoo Park, Seongnam-si (KR); Jae Myung Kim, Seoul (KR); Seokhyeon Ha, Seoul (KR)

(73) Assignees: Seoul National University R&DB Foundation, Seoul (KR); hodooAI Lab Inc., Seoul (KR)

( * ) Notice: Subject to any disclaimer, the term of this patent is extended or adjusted under 35 U.S.C. 154(b) by 558 days.

(21) Appl. No.: 16/706,679

(22) Filed: Dec. 7, 2019

(65) Prior Publication Data
US 2020/0184312 A1  Jun. 11, 2020

(30) Foreign Application Priority Data
Dec. 7, 2018   (KR) .......................... 10-2018-0157352

(51) Int. Cl.
*G06N 3/04*   (2006.01)
*G06N 3/08*   (2006.01)
(52) U.S. Cl.
CPC ............. *G06N 3/0436* (2013.01); *G06N 3/08* (2013.01)

(58) Field of Classification Search
CPC .............................. G06N 3/0436; G06N 3/08
USPC ...................... 706/2, 1, 6, 12, 15, 16, 25, 21
See application file for complete search history.

(56) References Cited

U.S. PATENT DOCUMENTS

| 2018/0240031 | A1* | 8/2018 | Huszar .................... G06F 16/22 |
| 2019/0051056 | A1* | 2/2019 | Chiu ........................ G06N 3/08 |
| 2019/0347548 | A1* | 11/2019 | Amizadeh ............ G06N 3/0445 |
| 2020/0074269 | A1* | 3/2020 | Trygg ..................... G06F 17/18 |

OTHER PUBLICATIONS

Tim Pearce et al., "Uncertainty in Neural Networks: Bayesian Ensembling", arXiv, Oct. 22, 2018.
Non-final Office Action dated Jun. 2, 2020 for Korean Application No. 10-2018-0157352.

* cited by examiner

*Primary Examiner* — Thjuan K Addy
(74) *Attorney, Agent, or Firm* — Insight Law Group, PLLC; Seung Lee (57) ABSTRACT

An uncertainty prediction apparatus includes an artificial neural network model trained based on deep learning, sampling models modeled by at least two weights obtained through sampling during a training process for the artificial neural network model, and an output generation unit configured to generate a result value reflecting an uncertainty degree by aggregating values output from the artificial neural network model and the sampling models after the same data is input to the artificial neural network model and the sampling models.

9 Claims, 6 Drawing Sheets

APPARATUS AND METHOD FOR GENERATING SAMPLING MODEL FOR UNCERTAINTY PREDICTION, AND APPARATUS FOR PREDICTING UNCERTAINTY

CROSS-REFERENCE TO RELATED APPLICATION(S)

This application claims priority from Korean Patent Application No. 10-2018-0157352, filed on Dec. 7, 2018, in the Korean Intellectual Property Office, the disclosure of which is incorporated herein by reference in its entirety.

BACKGROUND

1. Field

The following description relates to deep learning technology, and more particularly, to a deep-learning-based apparatus and method capable of predicting uncertainty.

2. Description of Related Art

Recently, deep learning models outperform people in various fields, such as computer vision, natural language processing, and machine control. However, current models have limitations in that these models cannot predict uncertainty.

However, predicting this uncertainty is very important in fields such as medical diagnostics or autonomous vehicles. That is, when a deep learning model predicts a correct answer and also even provides information about the uncertainty of the predicted correct answer, a medical diagnostic export or an autonomous driving expert will be able to make a more accurate decision based on the uncertainty.

SUMMARY

This summary is provided to introduce a selection of concepts in a simplified form that are further described below in the Detailed Description. This summary is not intended to identify key features or essential features of the claimed subject matter, nor it intended to be used as an aid in determining the scope of the claimed subject matter.

The following description relates to a sampling model generation apparatus and method for uncertainty prediction to discover an approximate posterior distribution of a neural network weight using a stochastic gradient.

The following description also relates to an uncertainty prediction apparatus capable of providing uncertainty information regarding an estimated answer of an artificial neural network using sampling models.

In one general aspect, there is provided an uncertainty prediction apparatus including an artificial neural network model trained based on deep learning, sampling models modeled by at least two weights obtained through sampling during a training process for the artificial neural network model, and an output generation unit configured to generate a result value reflecting an uncertainty degree by aggregating values output from the artificial neural network model and the sampling models after the same data is input to the artificial neural network model and the sampling models.

In another general aspect, there is provided a sampling model generation method for uncertainty prediction, the sampling model generation method including inputting mini-batch data of a corresponding turn among training data to an artificial neural network, determining whether a weight is in proximity to a local minimum value on the basis of an output value of the artificial neural network, generating a sampling model modeled with the corresponding weight and updating the weight through addition of Gaussian noise when it is determined that the weight is in close proximity to the local minimum value, and updating the weight when it is determined that the weight is not in close proximity to the local minimum value, wherein the operations of the inputting, the determining, the generating, and the updating are sequentially repeated.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, a medical image segmentation deep-learning model generation apparatus and method and a medical image segmentation deep-learning model generated using the same according to exemplary embodiments will be described below in detail with reference to the accompanying drawings. Here, the same reference numerals are used for the same components, and repetitive descriptions and detailed descriptions related to well-known functions or elements will be omitted in order not to unnecessarily obscure subject matters of the present invention. The embodiments of the present invention are provided to describe the present invention more fully to those skilled in the art. Accordingly, in the accompanying drawings of the present invention, shapes and dimensions of components may be exaggerated for clarity.

The combinations of the blocks of the block diagram and the operations of the flowchart may be performed by computer program instructions (execution engines), and these computer program instructions may be provided to a processor of a general-purpose computer, a special purpose computer, or another programmable data processing apparatus so that the instructions, which are executed via a processor of a computer or another programmable data processing apparatus, create a means for performing the functions specified in the blocks of the block diagram or the operations of the flowchart.

These computer program instructions may also be stored in a computer readable storage medium that can direct a computer, a programmable data processing apparatus, and/or other devices to function in a particular manner so that the computer readable storage medium having instructions stored therein comprises an article of manufacture including instructions which implement aspects of the function/act specified in the flowchart and/or block diagram block or blocks.

The computer program instructions may also be loaded onto a computer, other programmable data processing apparatus, or other device to cause a series of operational steps to be performed on the computer, other programmable apparatus or other device to produce a computer implemented process so that the instructions which are executed on the computer, other programmable apparatus, or other device implement the functions/acts specified in the flowchart and/or block diagram block or blocks.

In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

Hereinafter, embodiments of the present invention will be described in detail with reference to the accompanying drawings. The present invention may, however, be embodied in different forms and should not be constructed as limited to the embodiments set forth herein. Rather, these embodiments are provided so that this disclosure will be thorough and complete and will fully convey the scope of the present invention to those skilled in the art.

As a method of expressing uncertainty in a deep learning model, there is a Bayesian neural network that views a network value as a stochastic value rather than a deterministic value. The Bayesian deep-learning method is classified as two methods, one of which is a variational Bayesian method, and the other of which is a method of applying a Markov Chain Monte Carlo (MCMC) method to a neural network.

Here, the MCMC method is a kind of sampling method and thus may gradually find an accurate posterior distribution. Corresponding samples may be used to approximately find representative values for the accurate posterior distribution such as the average and variance of the distribution. However, the MCMC method has a disadvantage in that all data should be viewed to obtain representative values and also in that it takes a long time due to the presence of acceptance probability when a dataset is large.

As a method of compensating for the disadvantage of a conventional MCMC, Stochastic Gradient MCMC (SG-MCMC) has been proposed. This method uses only some data for the sampling and the acceptance step is not present. By using this method, the posterior distribution may be efficiently obtained even for a large dataset. Representatively, there is a stochastic gradient Langevin dynamics (SGLD) method. SGLD is a method of adding Gaussian noise to a gradient when a network is trained by conceptually incorporating Langevin dynamics into stochastic optimization. This is a first sampling algorithm using a stochastic gradient.

The present invention proposes a sampling model generation apparatus and method for uncertainty prediction and an uncertainty prediction apparatus which apply such a stochastic gradient. The uncertainty prediction apparatus may include a computing apparatus including a processor, a memory, and the like. In this case, a new scheme for finding an approximate posterior distribution by performing sampling to obtain a weight on the basis of a gradient certainty for determining whether the weight is in close proximity to a local minimum value while training a neural network is applied according to the present invention.

Figure 1:
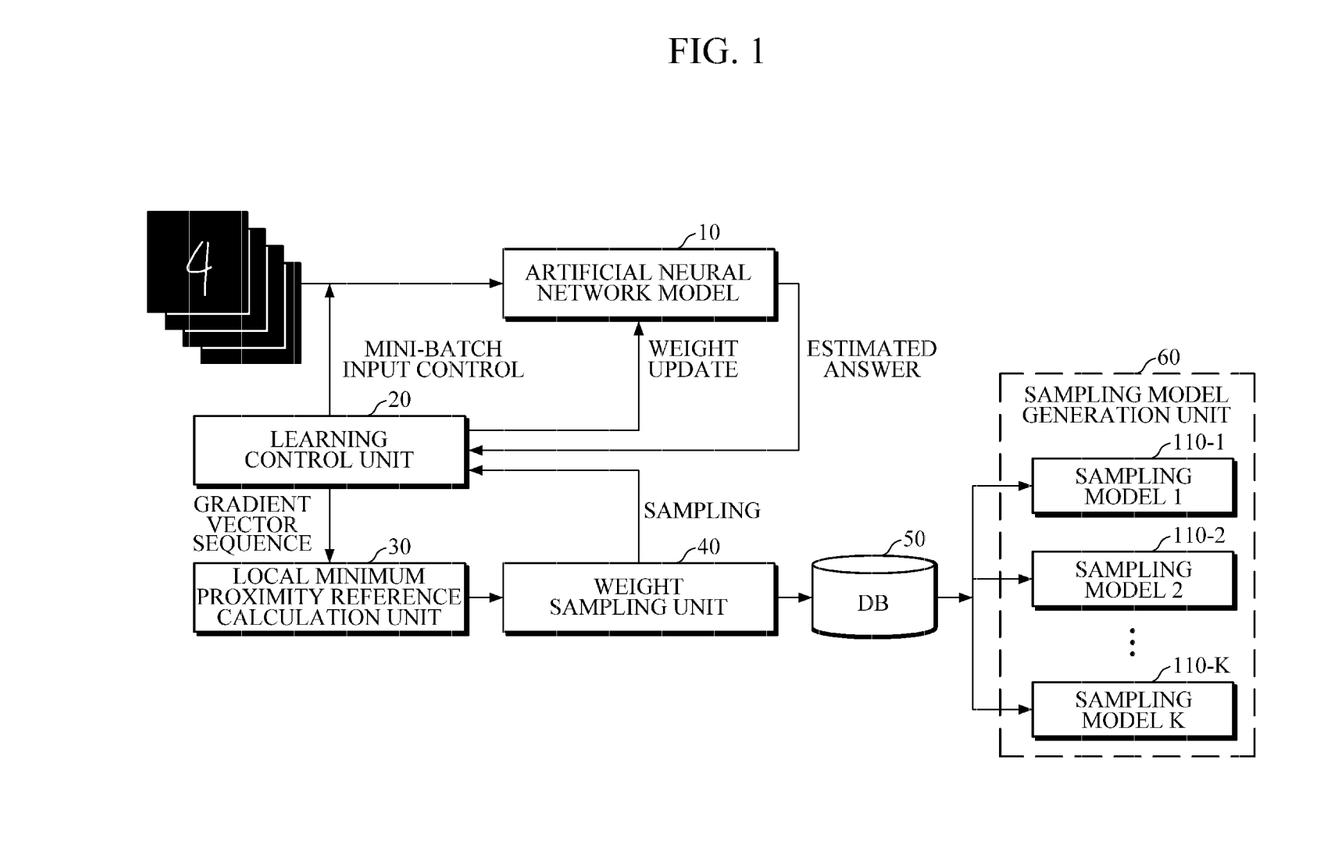
FIG. 1 is a block diagram illustrating an uncertainty prediction model generation apparatus according to an embodiment of the present invention.
Figure 2:
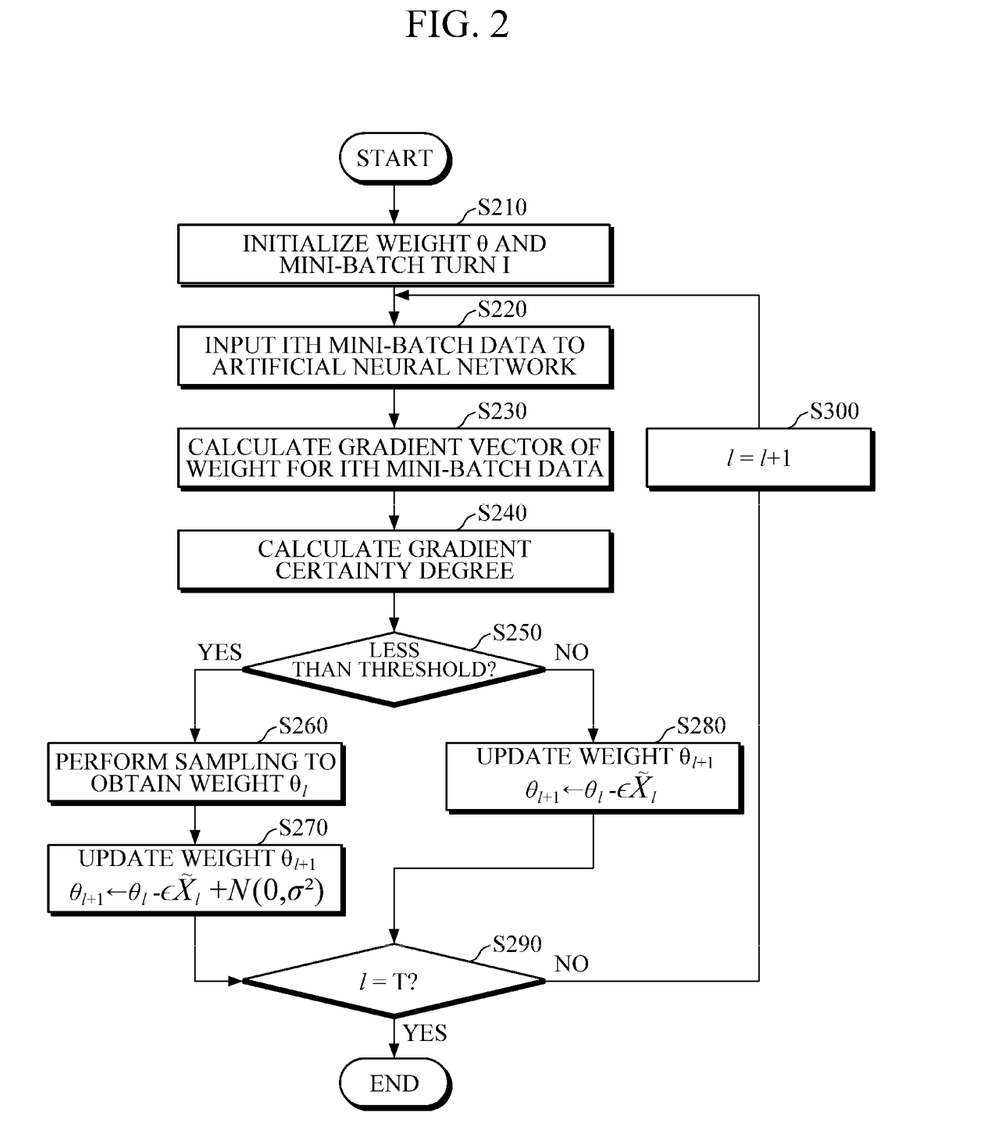
FIG. 2 is a flowchart illustrating an uncertainty prediction model generation method according to an embodiment of the present invention.

FIG. 1 is a block diagram illustrating a sampling model generation apparatus for uncertainty prediction according to an embodiment of the present invention, and FIG. 2 is a flowchart illustrating a sampling model generation method for predicting uncertainty according to an embodiment of the present invention.

At least a portion of the sampling model generation method for predicting uncertainty may be implemented with program instructions executed in the uncertainty prediction apparatus.

Referring to FIGS. 1 and 2, a learning control unit 20 initializes a weight $\theta_l$ and a mini-batch turn l of an artificial neural network model 10 (S210), and the learning control unit 20 inputs an ith piece of mini-batch data to the artificial neural network model 10 (S220).

Then, the learning control unit 20 calculates a gradient vector sequence of weights of data included in the ith mini-batch from an output value of the artificial neural network model 10 (S230). This is expressed using Equation 1 below:

$$X^{(l)} = (X_{l,1}, X_{l,2}, \ldots, X_{l,m}) \qquad \text{[Equation 1]}$$

where l indicates a mini-batch turn and m indicates a mini-batch size. Also, the gradient vector of the weight is calculated using Equation 2 below:

$$X_{l,i} = \nabla_\theta J(\theta; x^{(i)}, y^{(i)}) \qquad \text{[Equation 2]}$$

Then, a local minimum proximity calculation unit 30 calculates a gradient certainty defined as Equation 3 below:

$$\text{Gradient Certainty} = \Sigma_{i \neq j} \langle X_i, X_j \rangle \qquad \text{[Equation 3]}$$

where $\langle X_i, X_j \rangle$ indicates a dot product between two vectors.

The gradient certainty is an index indicating whether the weight is in proximity to a local optimum value. That is, the gradient certainty being small indicates that gradient values are usually small, and the gradient vector points to various directions. Thus, it may be determined that the corresponding weight has reached a local mode. On the other hand, the gradient certainty being large indicates that gradient values are usually large, and the gradient vector points to a certain direction. Thus, it may be determined that the corresponding weight is learned along a specific direction.

Accordingly, according to the present invention, in order to perform sampling to obtain a weight reached in the local mode, a weight sampling unit 40 determines whether the gradient certainty is less than a predetermined threshold (S250).

That is, only when the gradient certainty is less than the predetermined threshold in S250, that is, only when it is determined that the corresponding weight has reached the local mode, the weight sampling unit 40 performs sampling to obtain the corresponding weight (S260).

Then, the learning control unit 20 updates the weight differently depending on a determination that is delivered from the weight sampling unit 40 and that is made whether the sampling is performed. That is, when the sampling is performed to obtain the weight, the learning control unit 20 updates the weight by adding Gaussian noise to the gradient such that the weight exits the local mode (S270) as expressed in Equation 4 below:

$$\theta_{l+1} \leftarrow \theta_l - \epsilon \tilde{X}_l + N(0,\sigma^2)$$ [Equation 4]

On the other hand, when the sampling is not performed to obtain the weight, that is, when the gradient certainty is not less than the predetermined threshold, the learning control unit 20 updates the weight (S280) as shown in Equation 5 below:

$$\theta_{l+1} \leftarrow \theta_l - \epsilon \tilde{X}_l$$ [Equation 5]

In Equations 4 and 5, $\tilde{X}_l$ is a value calculated by the learning control unit 20 and is an average of gradient vectors of the weights of the data included in the ith mini-batch as expressed in Equation 6 below:

$$\tilde{X}_l \leftarrow \frac{1}{m} \sum_{i=1}^{m} X_{l,i}$$ [Equation 6]

Subsequently, the learning control unit 20 determines whether the mini-batch turn l has reached the last T pieces (S290). When the mini-batch data to be learned is present, the process returns to S220 after performing S320. Then, the learning control unit 20 performs the training of the artificial neural network model 10 to search for a new local mode.

The weights obtained through sampling according to the above process are stored in a database (DB) 50, and a sampling model generation unit 60 generates sampling models 110-1, 110-2, ..., 110-K having the same structure as the artificial neural network model 10 corresponding to the weights obtained through the sampling.

It is possible to express the uncertainty of the artificial neural network model 10 and the posterior distribution of the weights through output values of the sampling models 110-1, 110-2, ..., 110-K generated according to the present invention. Then, an uncertainty prediction apparatus using the sampling models 110-1, 110-2, ..., 110-K will be described with reference to FIGS. 3 and 5.

Figure 3:
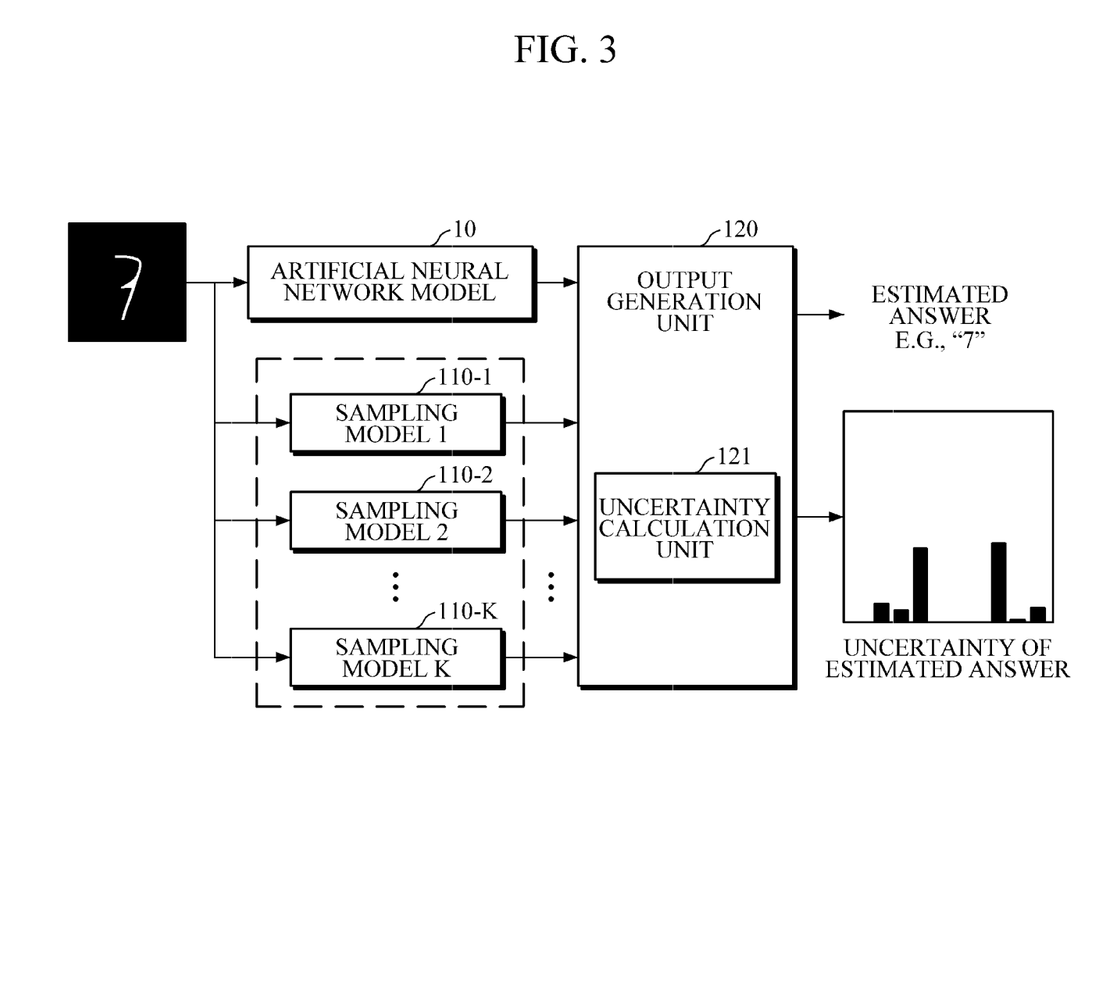
FIG. 3 is a block diagram showing an uncertainty prediction apparatus according to an embodiment of the present invention.
Figure 4:
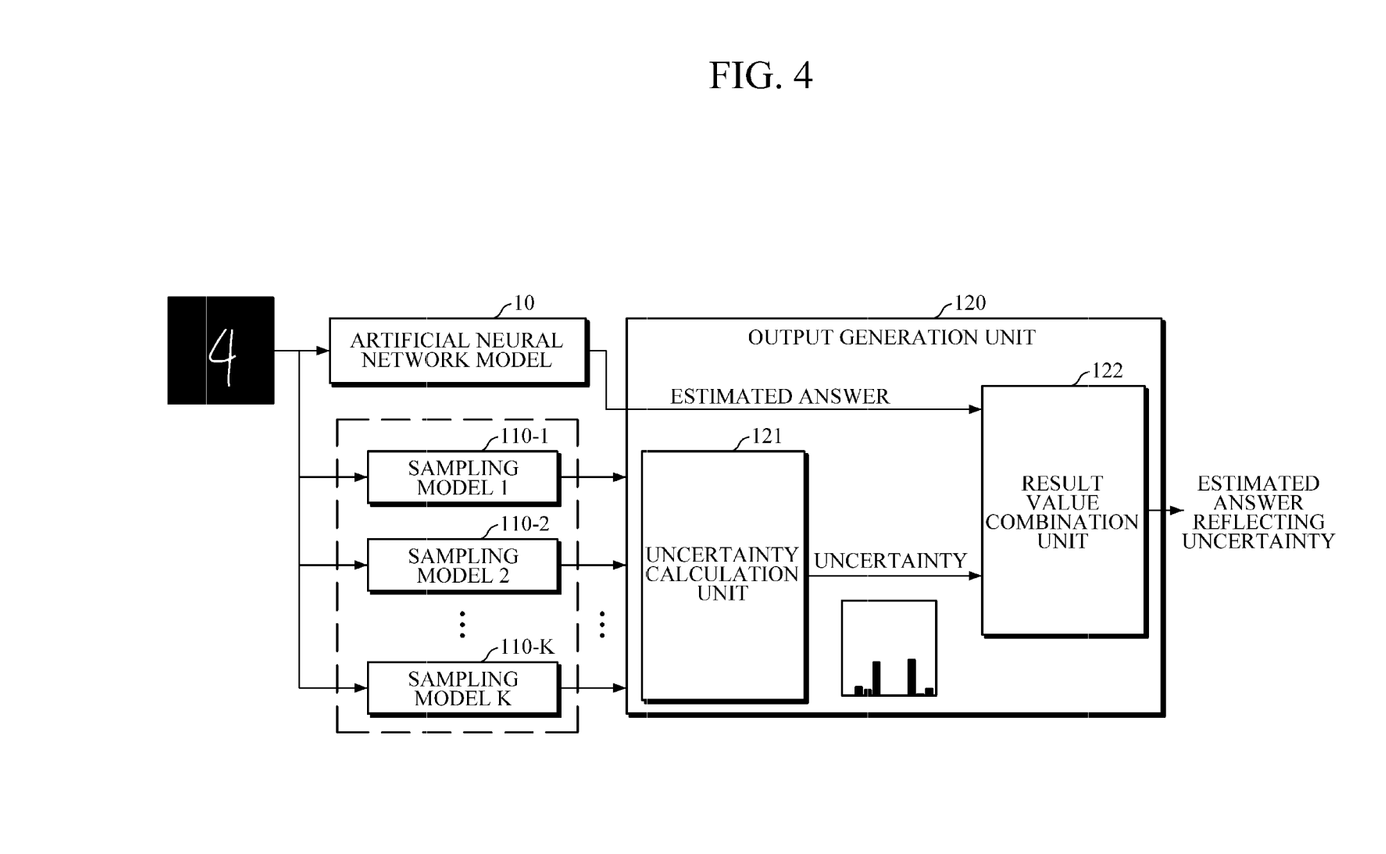
FIG. 4 is a block diagram showing an uncertainty prediction apparatus according to another embodiment of the present invention.

FIG. 3 is a block diagram showing an uncertainty prediction apparatus according to an embodiment of the present invention, and FIG. 4 is a block diagram showing an uncertainty prediction apparatus according to another embodiment of the present invention.

Referring to FIGS. 3 and 4, an uncertainty prediction apparatus 100 includes an artificial neural network model 10, at least two sampling models 110-1, 110-2, ..., 110-K, and an output generation unit 120.

The artificial neural network model 10 is a deep learning-based artificial intelligence learning model that is trained and generated by receiving labeled training data and generating an output value in close proximity to a label value. For example, the artificial neural network model 10 may be a classification model that is trained to output a value of one label of a training dataset or a probability vector value of a label value when number "4"-shaped image data is input.

Each of the sampling models 110-1, 110-2, ..., 110-K may be an artificial neural network model that is modeled by each of at least two weights obtained through sampling during the training process of the artificial neural network model 10. That is, as described above, the sampling models 110-1, 110-2, ..., 110-K are capable of expressing the uncertainty of the artificial neural network model 10 and are models implemented to express the approximate posterior distribution of the weight. Here, the at least two weights obtained through sampling may be determined to be in close proximity to the local minimum value. In more detail, as described above with reference to FIGS. 1 and 2, the at least two weights may be obtained through the sampling when the sum of dot products between the gradient vectors of the weights for the data of the mini-batch of the training data of the artificial neural network model is less than or equal to a predetermined threshold.

The output generation unit 120 inputs the same piece of data to the artificial neural network model 10 and the sampling models 110-1, 110-2, ..., 110-K, aggregates the output values of the models, and outputs a result value reflecting uncertainty expressed as the posterior distribution of the weights. To this end, the output generation unit 120 includes an uncertainty calculation unit 121 configured to collect output values from the sampling models 110-1, 110-2, ..., 110-K.

Here, the artificial neural network model 10 may be trained with training data labeled with one of N labels, and the output values of the sampling models 110-1, 110-2, ..., 110-K may be N-dimensional information, which includes probability values corresponding to the N labels.

In this case, according to an aspect, the uncertainty calculation unit 121 may output single N-dimensional information obtained by adding multiple pieces of N-dimensional information calculated from the sampling models 110-1, 110-2, ..., 110-K. For example, when the artificial neural network model 10 is a model trained with multiple pieces of MNIST data labeled with "0" to "9," the sampling models 110-1, 110-2, ..., 110-K may output the similarity degrees between the input data and labels "0" to "9" as probability values. That is, the sampling models 110-1, 110-2, ..., 110-K may output 10-dimensional probability information. Then, the uncertainty calculation unit 121 may add K pieces of 10-dimensional probability information and output the sum.

According to another aspect, the uncertainty calculation unit 121 may choose one label having a maximum probability value from each piece of the N-dimensional information calculated from the sampling models 110-1, 110-2, ..., 110-K and may output N-dimensional information, which is a value obtained by counting the number of choices for each label.

There may be various embodiments in which the output generation unit 120 generates and outputs a result value reflecting uncertainty output by the uncertainty calculation unit 121.

According to an embodiment, as shown in FIG. 3, the output generation unit 120 may separately output the uncertainty of an estimated answer output from the artificial neural network model 10 and the uncertainty of an estimated answer output from the uncertainty calculation unit 121 as the result value reflecting the uncertainty. For example, the output generation unit 120 may output a probability distribution for each of the labels "0" to "9" in addition to an estimated answer "7" for input data shown in FIG. 3. Then, even though the artificial neural network model 10 outputs an estimated answer "7," input data has a similar probability of being determined as "3" or "7" as a human would recognize. Thus, it can be assumed that the uncertainty of the estimated answer is large.

According to another embodiment, as shown in FIG. 4, the output generation unit 120 may further include a result value combination unit 122 and may output one estimated answer reflecting uncertainty on the basis of the uncertainty of an estimated answer output from the artificial neural network model 10 and the uncertainty of an estimated answer output from the uncertainty calculation unit 121. For example, the output generation unit 120 may add the N-dimensional probability information output from the artificial neural network model 10 and the N-dimensional probability information output from the uncertainty calculation unit 121, output the sum, and output a plurality of upper answer values from the sum. That is, the output generation unit 120 may output a result value indicating "the input image may be 3 or 7" as a human would recognize.

A test result for performance evaluation of the uncertainty prediction apparatus as described above will be described with reference to FIGS. 5 and 6. In order to roughly show the posterior distribution of the weights and check whether the uncertainty was expressed well, the artificial neural network model 10 was trained with the MNIST dataset, which includes a number image, and the performance of the uncertainty prediction apparatus was evaluated using MNIST data that is difficult to determine and a not MNIST dataset, which does not include a number image.

Figure 5:
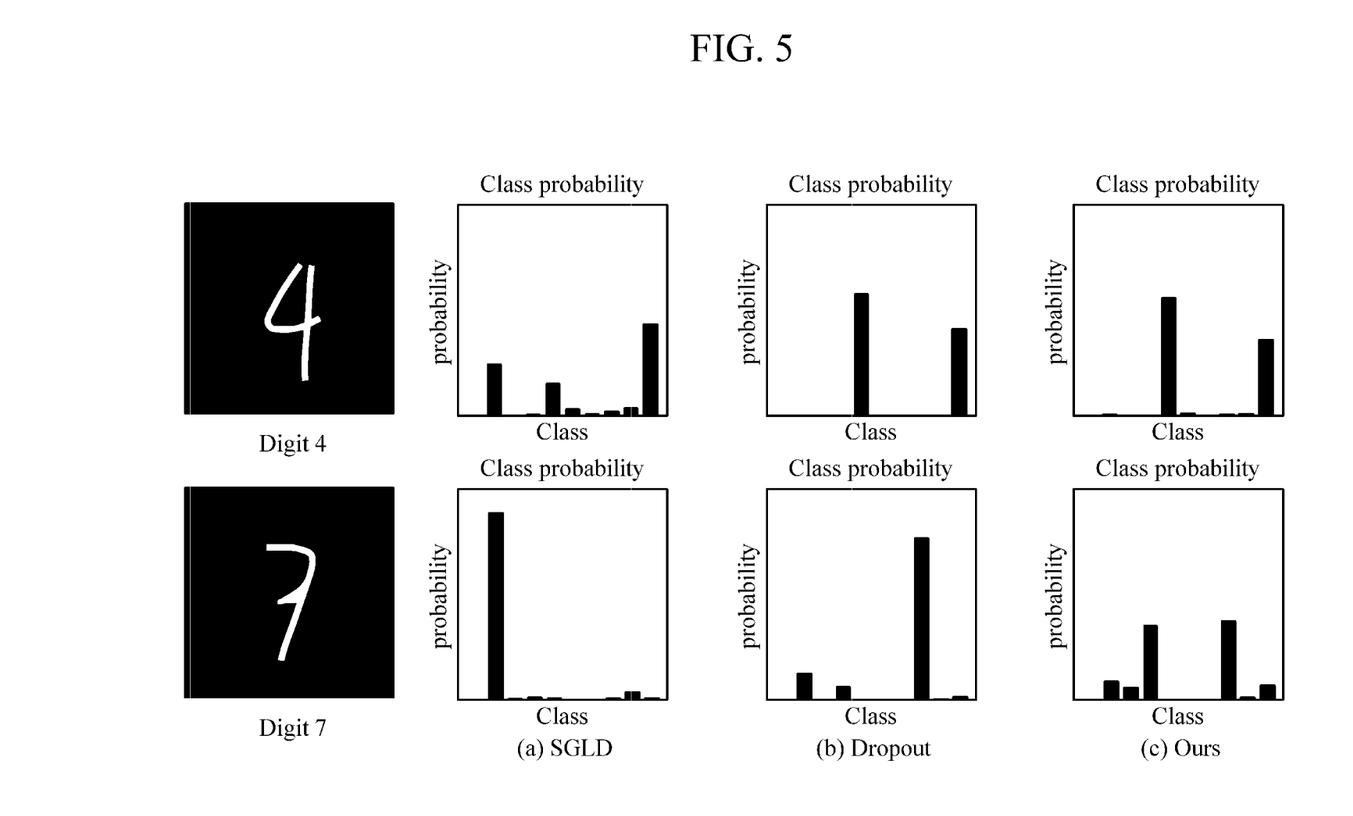
FIG. 5 is a diagram showing an uncertainty test result for MNIST data difficult to determine.
Figure 6:
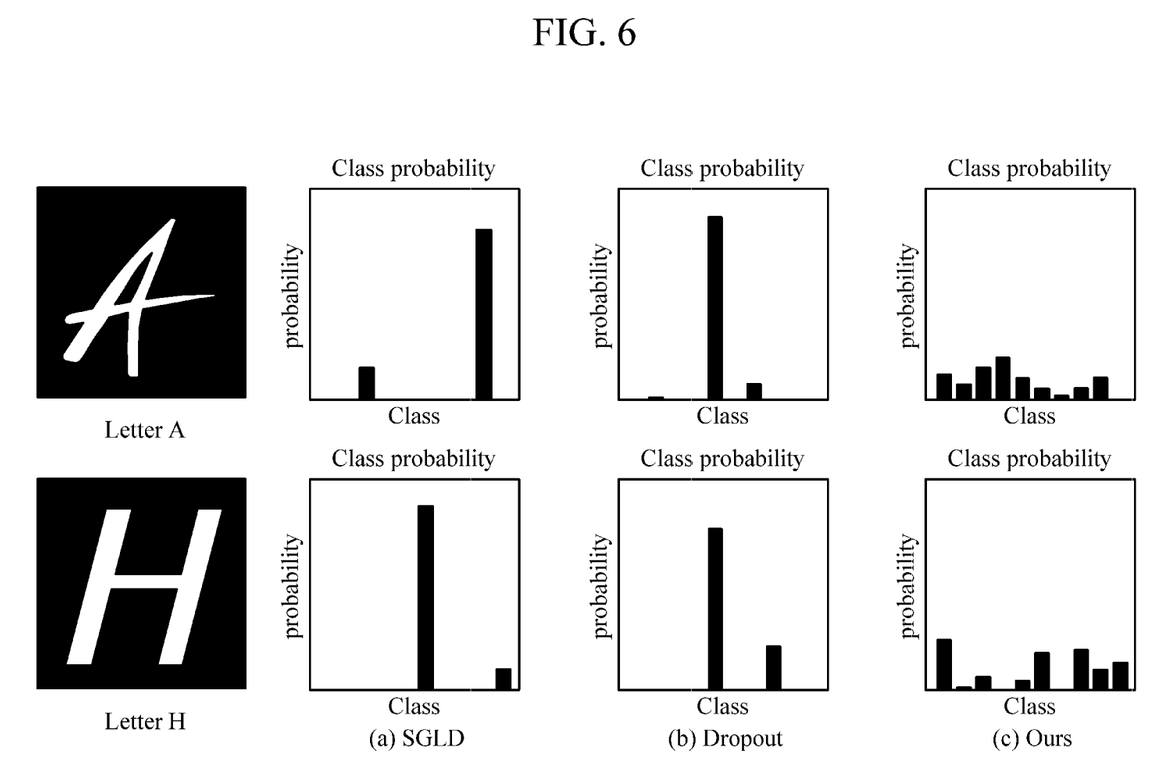
FIG. 6 is a diagram showing an uncertainty test result for not MNIST data.

FIG. 5 is a diagram showing an uncertainty test result for MNIST data difficult to determine, and FIG. 6 is a diagram showing an uncertainty test result for not MNIST data.

Referring to FIGS. 5 and 6, the MNIST dataset includes a 28*28 monochrome image, and a number 0 to 9 is handwritten therein. The not MNIST dataset also includes a 28*28 monochrome image like the MNIST, but various forms of alphabet letters A to J are drawn therein. Also, a result value caused by a model generated by SGLD ((a) of FIGS. 5 and 6) and Dropout ((b) of FIGS. 5 and 6) which are conventionally present was compared to a result value of the method ((c) of FIGS. 5 and 6) proposed according to the present invention.

An experiment was conducted on data that is difficult to determine as one number among MNIST test data. As shown in FIG. 5, an experiment was conducted on an algorithm for each picture that is difficult to determine as one number among the MNIST data. In the case of the first picture, the correct answer number is "4," but it seems to be "9." In the case of the second picture, the correct answer number is "7," but it seems to be "3." For the two pieces of data, the present invention found the correct answer number and also expressed uncertainty well. On the other hand, when a model trained with SGLD and MNIST data is tested using not MNIST data, the Dropout algorithm did not find a correct answer or found a correct answer with great confidence, and thus it is determined that uncertainty is not expressed well.

Subsequently, a case in which the model trained with MNIST is tested using the not MNIST data will be described. As shown in FIG. 6, SGLD and Dropout show that specific numbers are represented for A and H. However, according to the present invention, it is possible to express that the correct answer for the data is uncertain by displaying several results ranging from 0 to 9.

According to the present invention, it is possible to provide uncertainty information regarding an estimated answer of an artificial neural network through a sampling model capable of expressing an approximate posterior distribution of a neural network weight using a stochastic gradient.

The current embodiments can be implemented as computer readable codes in a computer readable record medium. Codes and code segments constituting the computer program can be easily inferred by a skilled computer programmer in the art. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An uncertainty prediction apparatus comprising:
an artificial neural network model trained based on deep learning;
sampling models modeled using at least two weights obtained by sampling weights of the artificial neural network model during a training process for the artificial neural network model; and
an output generation unit configured to generate a result value reflecting an uncertainty degree by aggregating values output from the artificial neural network model and the sampling models after the same data is input to the artificial neural network model and the sampling models.

2. The uncertainty prediction apparatus of claim 1, wherein the at least two weights are sampled on the basis of a gradient certainty for determining whether the weight is in close proximity to a local minimum value while training a neural network.

3. The uncertainty prediction apparatus of claim 1, wherein the sampling is performed to obtain the at least two weights when the sum of dot products between gradient vectors of weights for data of a mini-batch of training data of the artificial neural network model is less than or equal to a predetermined threshold.

4. The uncertainty prediction apparatus of claim 1, wherein,
the artificial neural network model is trained with training data labeled with one of N labels,
output values of the sampling models are N-dimensional information which includes probability values corresponding to the N labels, and
the output generation unit comprises an uncertainty degree calculation unit configured to output single N-dimensional information obtained by adding the pieces of N-dimensional information calculated from the sampling models.

5. The uncertainty prediction apparatus of claim 1, wherein,
the artificial neural network model is trained with training data labeled with one of N labels,
the output values of the sampling models are N-dimensional information which includes probability values corresponding to the N labels, and
the output generation unit comprises an uncertainty degree calculation unit configured to choose one label having a maximum probability value from the N-dimensional information calculated from the sampling models and output N-dimensional information, which is a value obtained by counting the number of choices for each label.

6. The uncertainty prediction apparatus of claim 4, wherein the output generation unit separately outputs an uncertainty degree of an estimated answer output from the uncertainty degree calculation unit in addition to an uncertainty degree of an estimated value output from the artificial neural network model.

7. The uncertainty prediction apparatus of claim 4, wherein the output generation unit further comprises a result value combination unit configured to calculate an estimated answer reflecting uncertainty on the basis of the estimated answer output from the artificial neural network model and the uncertainty degree output from the uncertainty degree calculation unit.

8. A sampling model generation method for uncertainty prediction, the sampling model generation method comprising:
inputting mini-batch data of a corresponding turn among training data to an artificial neural network;
determining whether a weight is in close proximity to a local minimum value on the basis of an output value of the artificial neural network;
generating a sampling model modeled with the corresponding weight and updating the weight through addition of Gaussian noise when it is determined that the weight is in close proximity to the local minimum value; and
updating the weight when it is determined that the weight is not in close proximity to the local minimum value,
wherein the determining comprises:
calculating gradient vectors of weights of the mini-batch data;
calculating a gradient certainty, where the gradient certainty is a sum of dot products between the gradient vectors; and
determining whether the gradient certainty is less than or equal to a predetermined threshold,
wherein the operations of the inputting, the determining, the generating, and the updating are sequentially repeated.

9. A sampling model generation apparatus for uncertainty prediction operated by the operations described in claim 8.

* * * * *